United States Patent
Higuchi et al.

(10) Patent No.: US 9,251,764 B2
(45) Date of Patent: Feb. 2, 2016

(54) INFORMATION PROCESSING DEVICE AND INFORMATION PROCESSING METHOD FOR PROCESSING AND DISPLAYING MULTI-PICTURE FORMAT IMAGES

(75) Inventors: Masaki Higuchi, Tokyo (JP); Masaki Takahashi, Kanagawa (JP); Fumiaki Hisamatsu, Tokyo (JP); Masaki Takase, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 333 days.

(21) Appl. No.: 13/371,934

(22) Filed: Feb. 13, 2012

(65) Prior Publication Data

US 2012/0229498 A1 Sep. 13, 2012

(30) Foreign Application Priority Data

Mar. 9, 2011 (JP) ................................. 2011-052030

(51) Int. Cl.
- G09G 5/00 (2006.01)
- G09G 5/36 (2006.01)
- H04N 1/32 (2006.01)

(52) U.S. Cl.
CPC ........... *G09G 5/363* (2013.01); *H04N 1/32128* (2013.01); *G09G 2340/02* (2013.01); *H04N 2201/3247* (2013.01); *H04N 2201/3277* (2013.01); *H04N 2201/3278* (2013.01)

(58) Field of Classification Search
None
See application file for complete search history.

(56) References Cited

U.S. PATENT DOCUMENTS

| 7,605,776 | B2 | 10/2009 | Satoh |
| 8,159,529 | B2* | 4/2012 | Yoshida et al. ................. 348/51 |
| 9,013,548 | B2* | 4/2015 | Suh et al. ......................... 348/43 |
| 2001/0052993 | A1* | 12/2001 | Lumley ........................ 358/1.12 |
| 2002/0033837 | A1* | 3/2002 | Munro .......................... 345/654 |
| 2003/0133007 | A1* | 7/2003 | Iijima et al. ..................... 348/46 |
| 2004/0056981 | A1* | 3/2004 | Hamamura et al. .......... 348/578 |
| 2005/0037314 | A1* | 2/2005 | Morris et al. ................... 433/26 |
| 2005/0210414 | A1* | 9/2005 | Angiulo et al. ............... 715/838 |
| 2006/0143652 | A1* | 6/2006 | Chung ............................ 725/43 |
| 2006/0279750 | A1* | 12/2006 | Ha ..................... H04N 13/0454 358/1.2 |
| 2007/0257902 | A1 | 11/2007 | Satoh |

(Continued)

FOREIGN PATENT DOCUMENTS

| JP | 2004-334833 A | 11/2004 |
| JP | 2007-028296 A | 2/2007 |

OTHER PUBLICATIONS

Superuser.com "Why does restarting a computer fix things?" 2009.*

(Continued)

*Primary Examiner* — Barry Drennan
*Assistant Examiner* — Jason Pringle-Parker
(74) *Attorney, Agent, or Firm* — Matthew B. Dernier, Esq.

(57) ABSTRACT

A display format identification unit identifies a display format defined in a plurality of items of image data associated with each other. A message communication unit communicates a message corresponding to the identified display format when an image generation unit generates a display image in a display format different from the identified display format. A communication storage unit stores a record indicating that the message communication unit communicates a message. If the communication storage unit stores the record indicating that the message was communicated, the message communication unit does not communicate a message again.

11 Claims, 9 Drawing Sheets

(56) References Cited

U.S. PATENT DOCUMENTS

| | | | |
|---|---|---|---|
| 2008/0158346 A1* | 7/2008 | Okamoto et al. | 348/47 |
| 2008/0309755 A1 | 12/2008 | Yoshida | |
| 2009/0070820 A1* | 3/2009 | Li | 725/62 |
| 2009/0172598 A1* | 7/2009 | Yamanaka et al. | 715/841 |
| 2010/0023555 A1* | 1/2010 | Macaskill | 707/104.1 |
| 2010/0039428 A1* | 2/2010 | Kim | H04N 13/0454 345/419 |
| 2011/0090315 A1* | 4/2011 | Shibata | 348/46 |
| 2011/0102544 A1* | 5/2011 | Kim | 348/43 |
| 2011/0126160 A1* | 5/2011 | Han et al. | 715/848 |
| 2011/0176174 A1* | 7/2011 | Terao | 358/1.15 |
| 2012/0249736 A1* | 10/2012 | Barrett et al. | 348/43 |

OTHER PUBLICATIONS

InterfaceLIFT Desktop Wallpaper "http://www.interfacelift.com/wallpaper/", Feb. 15, 2005.*

Office Action issued for corresponding Japanese Patent Application No. 2011-052030, dated Feb. 19, 2013.

Standard of the Camera & Imaging Products Association, CIPA DC-007-Translation-2009, Multi-Picture Format, Camera & Imaging Products Association, pp. 1-60, Feb. 4, 2009.

* cited by examiner

INFORMATION PROCESSING DEVICE AND INFORMATION PROCESSING METHOD FOR PROCESSING AND DISPLAYING MULTI-PICTURE FORMAT IMAGES

BACKGROUND OF THE INVENTION

1. Field of the Invention

The present invention relates to a technology of displaying an image.

2. Description of the Related Art

Associated with the improvement in capabilities and performance of digital cameras, a format designed to record a collection of a plurality of items of image data associated with each other is defined. The standard formulated by Camera & Imaging Products Association defines a data structure for recording a plurality of items of image data and provides a format called Multi-Picture Format that uses the data structure.

"Standard of the Camera & Imaging Products Association, CIPA DC-007-Translation-2009, Multi-Picture Format", Camera & Imaging Products Association, Feb. 4, 2009, Internet<URL: http://www.cipa.jp/english/hyoujunka/kikaku/pdf/DC-007_E.pdf>

In the multi-picture format, "multiview" is defined as an image type. Multiview is broken down into "panorama", "stereoscopic view", and "multiangle" types. Each of the types designates a display format in a viewer. The image type is determined when the user using a digital camera to take a picture configures a photographic mode. A plurality of items of image data taken is collected by an internal circuit of the digital camera into a single image file that includes an image type code.

SUMMARY OF THE INVENTION

A purpose of the present invention is to provide a technology of properly reproducing image data for which a display format is designated.

The information processing device according to an embodiment of the present invention comprises: a first image generation unit configured to generate a first image including format information indicating a display format of a plurality of items of image data associated with each other; a second image generation unit configured to generate a second image by using at least one of the plurality of items of image data associated with each other; and a message communication unit configured to communicate a predetermined message when the second image generation unit generates the second image in a display format different from the display format indicated by the format information included in the first image.

The information processing method according to another embodiment of the present invention comprises: identifying a display format defined for a plurality of items of image data associated with each other; determining whether to generate an image in the identified display format; generating, when it is determined that an image is not generated in the identified display format, an image by using at least one of the plurality of items of image data associated with each other in a display format different from the identified display format; and communicating a predetermined message when an image is generated in a display format different from the identified display format.

The information processing method according to still another embodiment of the present invention comprises: generating a first image including format information indicating a display format of a plurality of items of image data associated with each other; generating a second image by using at least one of the plurality of items of image data associated with each other; and communicating a predetermined message when the second image is generated in a display format different from the display format indicated by the format information included in the first image.

Optional combinations of the aforementioned constituting elements, and implementations of the invention in the form of methods, apparatuses, systems, computer programs, data structures, and recording mediums may also be practiced as additional modes of the present invention.

DETAILED DESCRIPTION OF THE INVENTION

The invention will now be described by reference to the preferred embodiments. This does not intend to limit the scope of the present invention, but to exemplify the invention.

Figure 1:
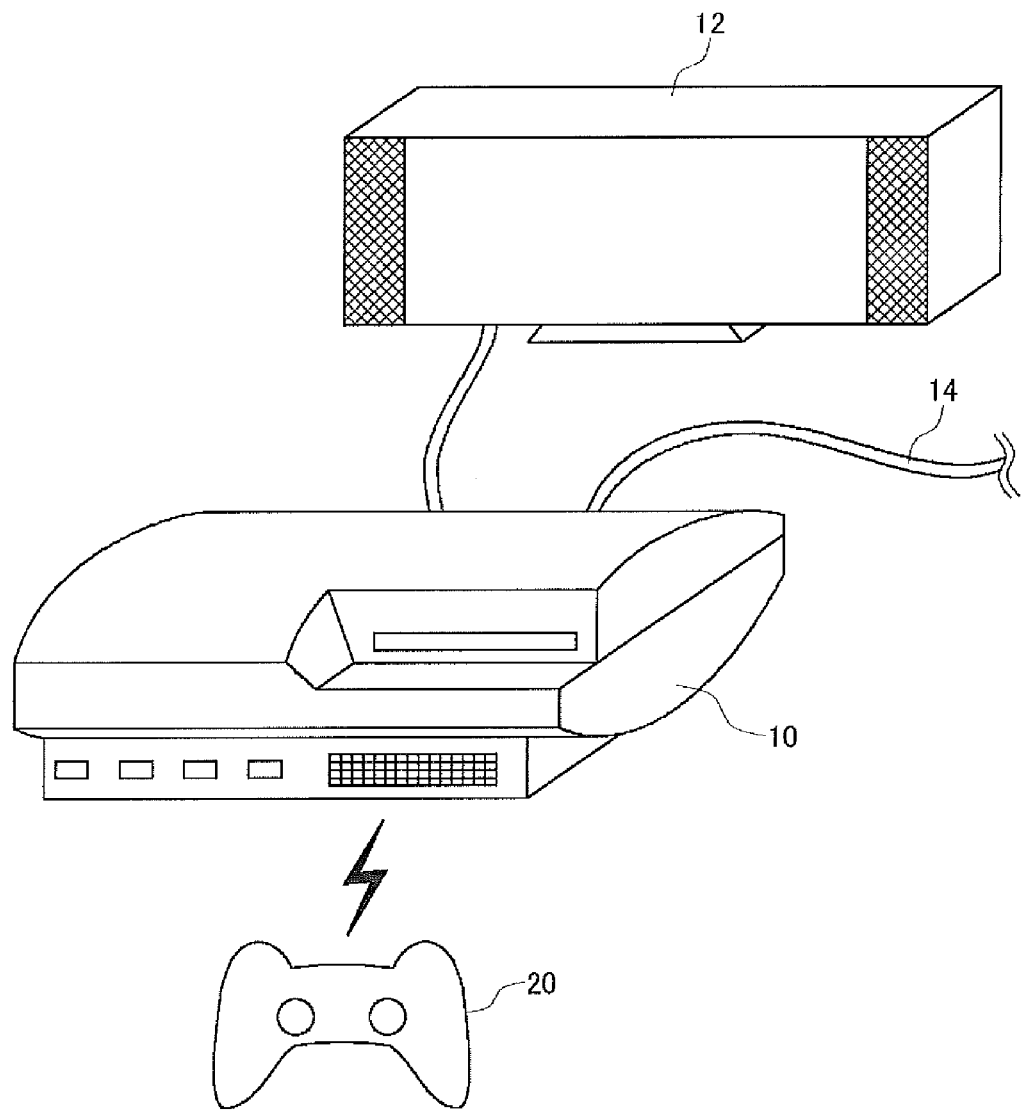
FIG. 1 shows an environment in which the information processing system according to an embodiment of the present invention is used.

FIG. 1 shows an environment in which the information processing system 1 according to an embodiment of the present invention is used. The information processing system 1 comprises an input device 20, an information processing device 10 configured to execute an application software for image processing, and a display device 12 configured to output a result of processing by the information processing device 10. The display device 12 may be a television set provided with a display for outputting an image and with a speaker for outputting sound. Alternatively, the display device 12 may be a computer display. The display device 12 may be connected to the information processing device 10 by cable or connected wirelessly using, for example, wireless LAN (Local Area Network). The information processing device 10, the input device 20, and the display device 12 may be formed integrally. For example, the devices may be configured as a mobile terminal provided with image processing function.

The information processing device 10 in the information processing system 1 is connected to an external device such as a personal computer via a cable 14 and so can obtain image data from the external device. The information processing device 10 is also provided with a universal serial bus (USB) terminal and so can obtain image data from a digital camera by connecting to the digital camera using a USB cable. The information processing device 10 may also be provided with a media drive to obtain image data from a ROM medium.

The information processing device 10 may be a game device. The image processing function may be achieved by loading an application program for image processing. The information processing device 10 may be a personal computer. The image processing function may be achieved by loading the application program for image processing.

Figure 2:
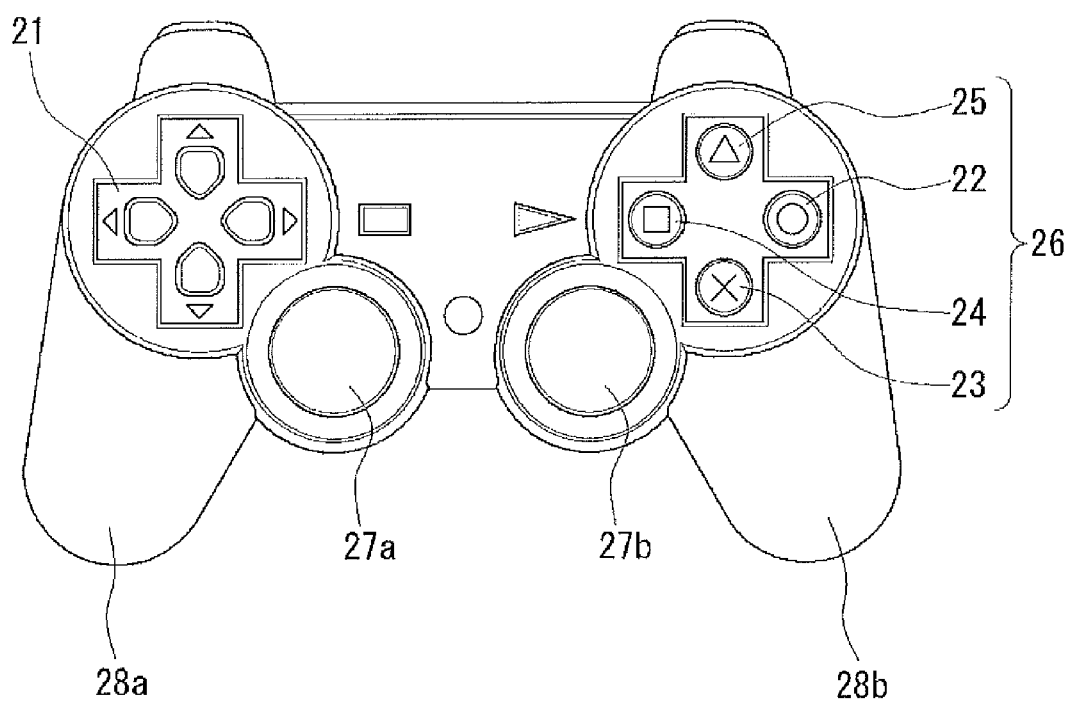
FIG. 2 shows the appearance of the input device.

FIG. 2 shows the appearance of the input device 20. The input device 20 is provided with directional keys 21, analog sticks 27a, 27b, and four control buttons 26, which are means for user control. The four buttons 26 comprise a circle button 22, a cross button 23, a square button 24, and a triangle button 25. The user holds a left grip 28a with the left hand and holds a right grip 28b with the right hand.

The input device 20 has the function of transferring a user input control signal to the information processing device 10. In the embodiment, the input device 20 is configured to be capable of communicating with the information processing device 10 wirelessly. The input device 20 and the information processing device 10 may establish wireless communication using the Bluetooth (registered trademark) protocol or the IEEE802.11 protocol. The input device 20 may be connected to the information processing device 10 via a cable so as to transfer a user input control signal to the information processing device 10.

Figure 3:
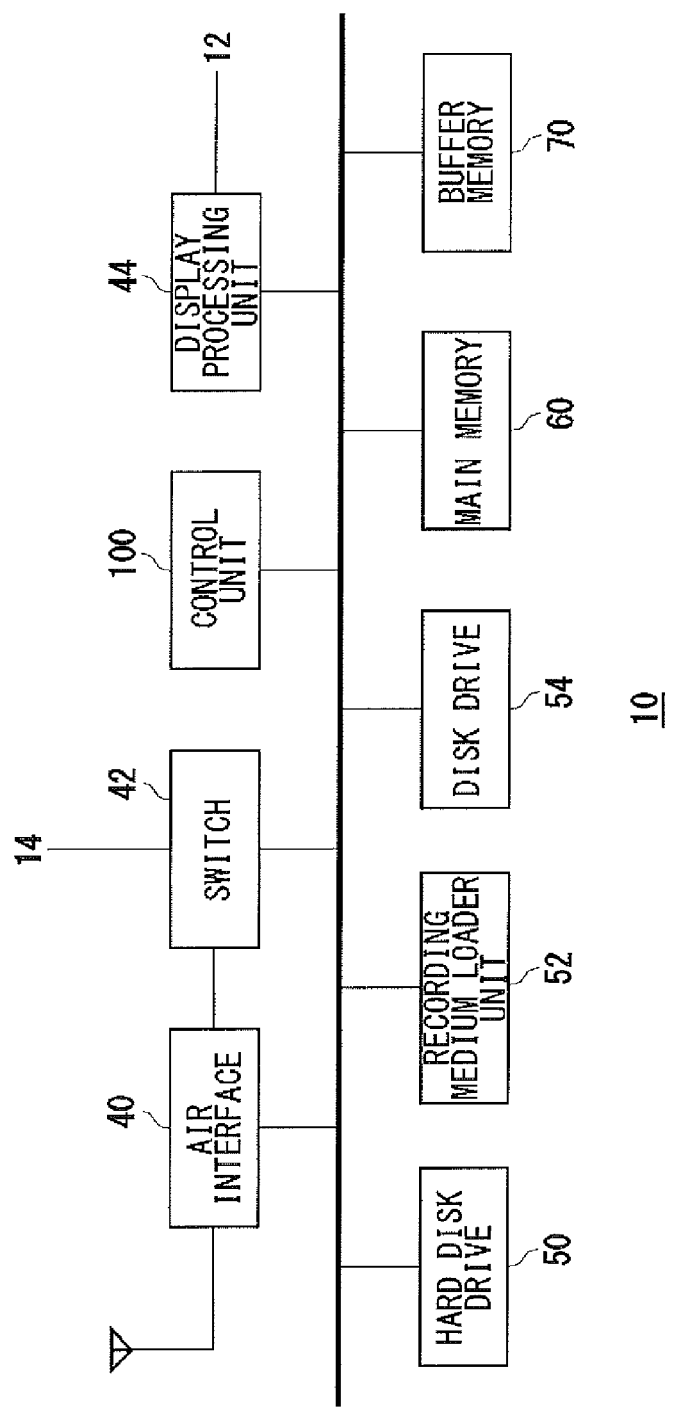
FIG. 3 is a functional block diagram of the information processing device.

FIG. 3 is a functional block diagram of the information processing device 10. The information processing device 10 comprises an air interface 40, a switch 42, a display processing unit 44, a hard disk drive 50, a recording medium loader unit 52, a disk drive 54, a main memory 60, a buffer memory 70, and a control unit 100. The display processing unit 44 is provided with a frame memory for buffering data to be displayed on the display of the display device 12.

The switch 42 is an Ethernet switch (Ethernet is a registered trademark) connected to an external device by cable or wirelessly so as to transmit and receive data. The switch 42 is connected to the air interface 40. The air interface 40 is connected to the input device 20 using a predefined wireless communication protocol. A control signal input by the user via the input device 20 is supplied to the control unit 100 via the air interface 40 and the switch 42.

The switch 42 is connected to an external device via the cable 14 and obtains a plurality of items of image data associated with each other from the external device. The plurality of items of image data associated with each other may be an image file (hereinafter, referred to as "MP file") defined in the multipicture format (hereinafter, referred to as "MP format"). The plurality of items of image data may be associated with each other by describing information indicating the relationship between the plurality of items of image data in a separate file. Alternatively, the plurality of items of image data may be associated with each other by generating the file names of the individual items of image data according to a predetermined rule and storing the data in the same folder. As described, the plurality of items of image data may be associated with each other in a variety of methods. Hereinafter, association using an MP file will be described by way of example.

The hard disk drive 50 functions as an auxiliary storage device for storing data. The MP file received via the switch 42 may be stored in the hard disk drive 50. The MP file stored in the hard disk drive 50 is read into the main memory 60 or the buffer memory 70 for display processing. When a removable recording medium such as a memory card is mounted, the recording medium loader unit 52 reads data from the removable recording medium. When a ROM disk is mounted, the disk drive 54 drives and recognizes the ROM disk so as to read data. The ROM disk may be an optical disk or a magneto-optical disk. The MP file may be stored in a removable recording medium or a ROM disk and installed in the hard disk drive 50 from the recording medium loader unit 52 or the disk drive 54. Alternatively, the MP file may be read into the main memory 60 or the buffer memory 70 to be subject to display processing.

The control unit 100 is provided with a multicore CPU. One general-purpose processor core and a plurality of simple processor cores are provided in a single CPU. The general-purpose processor core is referred to as a power processing unit (PPU) and the other processor cores are referred to as synergistic-processing units (SPU).

The control unit 100 is provided with a memory controller connected to the main memory 60 and the buffer memory 70. The PPU is provided with a register and a main processor as an entity of execution of operation. The PPU efficiently allocates tasks as basic units of processing in applications to the respective SPUs. The PPU itself may execute a task. The SPU is provided with a register, a subprocessor as an entity of execution of operation, and a local memory as a local storage area. The local memory may be used as the buffer memory 70. The main memory 60 and the buffer memory 70 are formed as random access memories (RAM). The SPU is provided with a dedicated direct memory access (DMA) controller and is capable of high-speed data transfer between the main memory 60 and the buffer memory 70. High-speed data transfer is also achieved between the frame memory in the display processing unit 44 and the buffer memory 70. The control unit 100 according to the embodiment implements high-speed image processing by operating a plurality of SPUs in parallel. The display processing unit 44 is connected to the display device 12 and outputs a result of image processing in accordance with user request.

Figure 4:
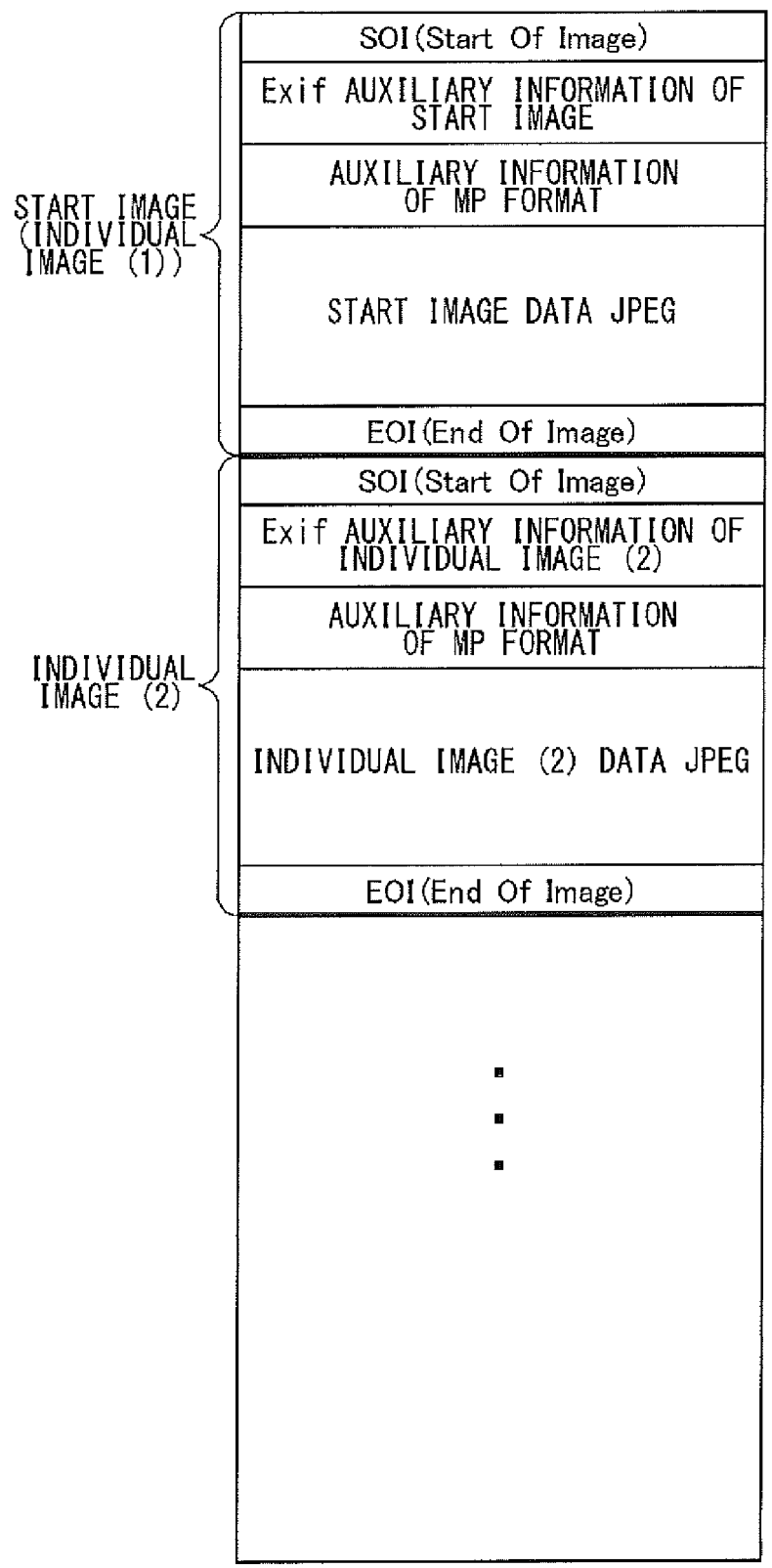
FIG. 4 shows the basic configuration of the MP format.

FIG. 4 shows the basic configuration of the MP format. An MP file can contain a single or a plurality of individual images following a start image. FIG. 4 only shows one individual image (2) following the start image (individual image (1)), but the file could contain a plurality of individual images following the start image. Basically, the start image and the subsequent individual images contain Exif auxiliary information and MP format auxiliary information.

Exif Auxiliary Information

Exchangeable Image File Format (Exif) is a format to record an image file. Along with image data, the format can include in the image file various auxiliary information produced at the time of imaging. Exif auxiliary information includes information related photographic information such as the date and time that the image was taken, camera type, shutter speed, lens stop setting, etc., and also includes information (compression mode, color space, number of pixels, etc.) for reading the photographic image data properly. Exif auxiliary information also includes thumbnails of the images taken.

MP Format Auxiliary Information

The MP format auxiliary information of the start image includes an MP header, an MP index, MP individual information. The MP header includes an offset to the MP index. The MP format auxiliary information of the images other than the start image includes an MP header and MP individual information. The MP header includes an offset to the MP individual information.

(1) MP Index

An MP index is included only in the start image. An MP index is configured to include at least the following index information.

a) Number of Recorded Images

Indicates the number of individual images included in the MP file.

b) MP Entry

Indicates a group of data comprising individual image type management information, individual image sizes, individual image data offsets, and ancillary image entry number. Of these, the individual image type management information at least includes the following management information.

b-1) Representative Image Flag

If an individual image is a representative image, the flag is set to 1. If not, the flag is set to 0. A single MP file cannot contain two or more individual images for which the representative image flag is set to 1. A representative image represents all individual images in an MP file.

b-2) Type Code

Indicates the MP type of the individual image. In the MP format, "panorama", "stereoscopic view", and "multiangle" are defined as types of individual multiview images. As the user selects a photographic mode, an MP type is determined and added to the image as index information.

(2) MP Individual Information

MP individual information includes information according to the photographic mode. If the images are taken in the "panorama" mode, the MP individual information includes layout information indicating the layout of a plurality of images in one panorama image and width information indicating the width of two successive images that overlap. If the images are taken in the "stereoscopic view" mode, the MP individual information includes information on the angle of convergence with respect to a reference viewpoint and baseline length information indicating the baseline length with respect to the reference viewpoint. If the images are taken in the "multiangle" mode, the MP individual information includes the information on the distance in the horizontal axis direction, the distance in the vertical axis direction, the distance in the collimation axis direction, the angle of rotation around the vertical axis (yoke angle), the angle of rotation around the horizontal axis (pitch angle), and the angle of rotation around the collimation axis (roll angle).

A description will now be given of a process of reproducing an MP file.

Figure 5:
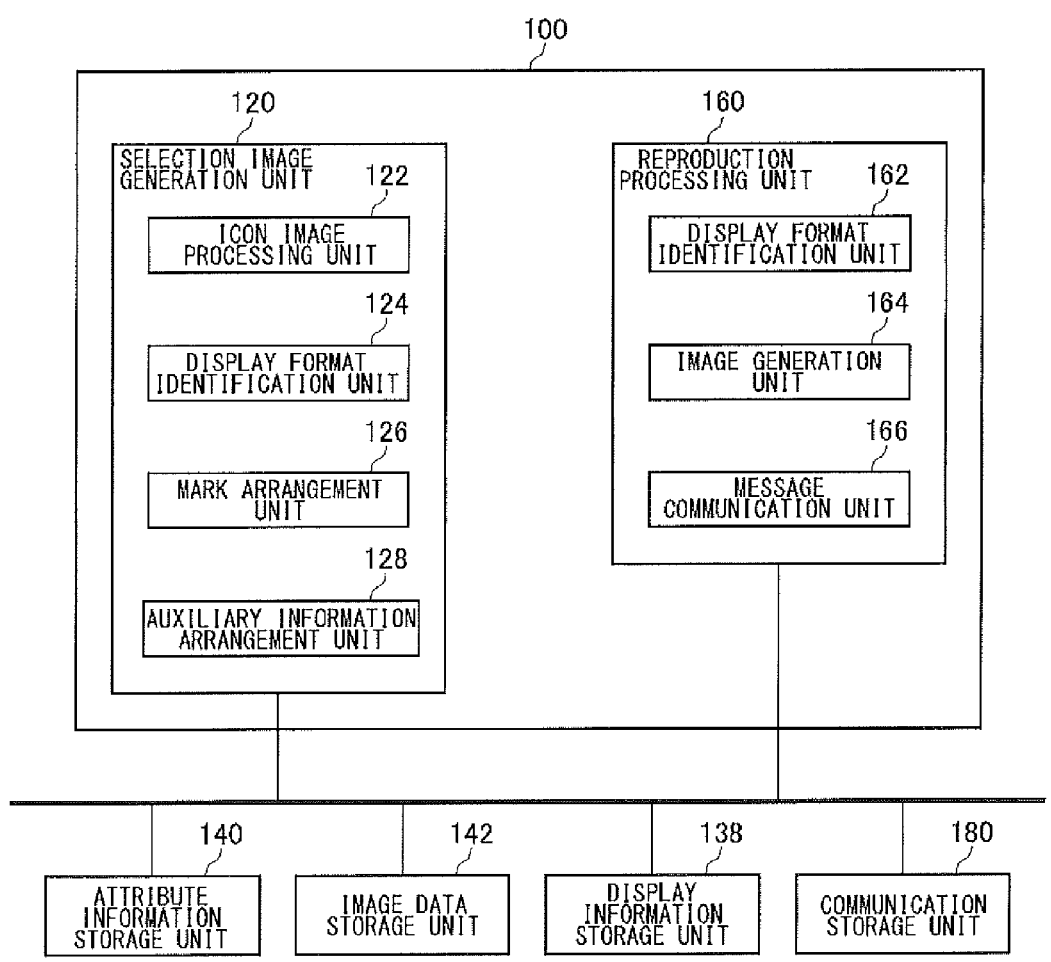
FIG. 5 mainly shows functional blocks of the control unit.

FIG. 5 mainly shows functional blocks of the control unit 100. The control unit 100 comprises a selection image generation unit 120 and a reproduction processing unit 160. The function of the selection image generation unit 120 is implemented by the system software of the information processing device 10. The function of the reproduction processing unit 160 is implemented by the image reproduction application (hereinafter, referred to as "image viewer") installed in the information processing device 10. The selection image generation unit 120 comprises an icon image processing unit 122, a display format identification unit 124, a mark arrangement unit 126, and auxiliary information arrangement unit 128. The selection image generation unit 120 generates a display image in which the user selects a plurality of items of image data associated with each other to view. The reproduction processing unit 160 comprises a display format identification unit 162, an image generation unit 164, and a message communication unit 166. The reproduction processing unit 160 reproduces image data.

The elements depicted in FIG. 5 as functional blocks for performing various processes are implemented by hardware such as a CPU, a main memory, or other LSI's, and by software such as a programs etc., loaded into the main memory. As already described, the control unit 100 is provided with one PPU and a plurality of SPU's. The PPU and the SPU's could form respective functional blocks either alone or in combination. Therefore, it will be obvious to those skilled in the art that the functional blocks may be implemented in a variety of manners by hardware only, software only, or a combination of thereof.

A display information storage unit 138 is configured in a storage area in the hard disk drive 50 and stores display information such as the display size, resolution, and output format of the display device 12. Display information is registered by the user when the information processing device 10 is connected to the display device 12. If the information processing device 10 is connected to the display device 12 by a High Definition Multimedia Interface (HDMI) cable, the display device 12 may communicate the display information to the information processing device 10 in response to an inquiry from the system software of the information processing device 10. In this embodiment, the output format as defined in the display information indicates whether the display device 12 is capable of three-dimensional display or only capable of two-dimensional display. The output format capable of three-dimensional display will be referred to as "3D compatible" and the output format only capable of two-dimensional display will be referred to as "2D compatible".

An image data storage 142 stores a plurality of items of image data associated with each other. The image viewer according to the embodiment is not only capable of reproducing photographic images stored in the hard disk drive 50 but also reproducing photographic images recorded in an external recording medium. Therefore, the image data storage unit 142 according to the embodiment is configured in a storage area of a recording medium in which the image data subject to reproduction is stored. The following description concerns a case where an MP file installed in the hard disk drive 50 from an external device is reproduced. In this case, the image data storage unit 142 is configured in a storage area in the hard disk drive 50.

When installing an MP file in the hard disk drive 50, the system software in the information processing device 10 refers to the auxiliary information included in the MP file to check the file. If the MP file is normal, the system software extracts at least part of the auxiliary information and stores it in an attribute information storage unit 140 as attribute information. The attribute information extracted according to the embodiment includes data displayed on the menu screen such as a thumbnail image.

Further, the system software identifies the display format of the MP file by referring to the auxiliary information of the MP file and stores it in the attribute information storage unit 140 as attribute information. As described with reference to FIG. 4, the MP index includes a type code indicating the MP type of individual images. The display format identification unit 124 refers to the type code to identify the display format of the MP file. For example, if the type code indicates an image type "stereoscopic view", the display format identification unit 124 identifies the display format of the MP file as being "stereoscopic view". If the type code indicates an image type "multiangle", the display format identification unit 124 identifies the display format of the MP file as being "multiangle". In the "stereoscopic view" display format, an image for the right eye and an image for the left eye are displayed. In the "multiangle" display format, images taken in a plurality of directions are switched for display. Thus, the display format identification unit 124 identifies the display format of an MP file according to the type code recorded in the MP file.

The display format identification unit 124 may map a type code to a display format of an MP file one to one. Depending on the MP file, however, a plurality of image types may be assigned to a single type code. More specifically, an MP file in which a type code indicating "stereoscopic view" is recorded may include a plurality of items of "multiangle" image data. In this case, when the display format identification unit 124 determines that the type code indicates "stereoscopic view", it is necessary to determine whether the actual image type is "stereoscopic view" or "multiangle".

To display an MP file in a stereoscopic view, the information on the angle of convergence and the base length information included in the MP individual information are essential. For stereoscopic display, two individual images suffice. Meanwhile, the information on the angle of convergence and the base length information are not necessary to display an MP file in a multiangle view. The display format identification unit 124 exploits the difference in the display format as described above to identify the actual type when the type code indicates "stereoscopic view" as described below.

If an MP file includes two individual images, the display format identification unit 124 determines that the actual type of the MP file is "stereoscopic view" and identifies the display format of the MP file as being "stereoscopic view". The display format identification unit 124 refers to the "number of recorded images" included in the MP index so as to identify the number of individual images included in the MP file. Meanwhile, if three or more individual images are included in an MP file and if the MP individual information does not include information on the angle of convergence or base length information, the display format identification unit 124 determines that the actual type of the MP file is "multiangle" and identifies the display format of the MP file as being "multiangle". Thus, the display format identification unit 124 identifies the display format of the MP file and stores the attribute information indicating the format in the attribute information storage unit 140 along with other auxiliary information.

Generation Processing of a Selection Screen

The selection image generation unit 120 of the information processing device 10 according to the embodiment generates a menu image that includes format information indicating the display format of a plurality of items of image data associated with each other. A menu image is displayed on the display device 12 and forms a menu screen in which the user selects a plurality of items of image data associated with each other to view. In the menu screen, a plurality of folder images are arranged horizontally. When the user selects a "photo" folder, icon images identifying the plurality of items of image data associated with each other are arranged in the vertical direction. When the use selects an icon image, the image viewer is started and the reproduction processing unit 160 starts reproducing the image data.

Figure 6:
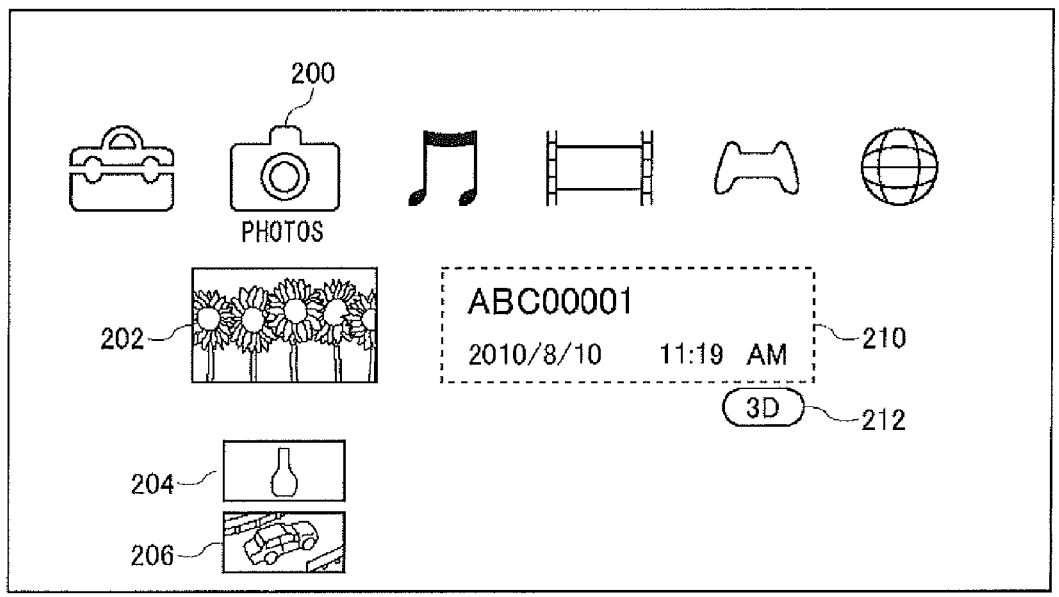
FIG. 6 shows an exemplary menu screen displayed on the display device.

FIG. 6 shows an exemplary menu screen displayed on the display device 12. Of the plurality of folder images arranged in the horizontal direction, a folder image 200 indicates a folder for photographic content. Icon images 202, 204, and 206 are arranged in the vertical direction. The user may manipulate the input device 20 to move a desired icon image to a position of focus area by scrolling and initiate a process associated with the icon image by pressing a predetermined button of the input device 20. In the example of FIG. 6, the icon image 202 of photographic content is located in the focus area. When the user presses the circle button 22 of the input device 20, a command for reproduction is generated and the image viewer is started. The menu screen of FIG. 6 does not show an icon image of a recording medium in which the image data is recorded, but an icon image of a recording medium may be displayed immediately below the photo icon image and the icon images 202, 204, and 206 may be arranged immediately below or to the right of the medium icon image. The selection image generation unit 120 generates menu image data and the display processing unit 44 outputs the menu image data to the display device 12.

The icon image processing unit 122 in the selection image generation unit 120 arranges an icon image corresponding to an MP file in the menu image. The icon image processing unit 122 reads, from the attribute information storage unit 140, a thumbnail image of an individual image for which the representative image flag is set to 1 and arranges the thumbnail image as an icon image in the menu image. In the menu screen shown in FIG. 6, the icon image processing unit 122 arranges the icon images 202, 204, and 206 for three MP files below the folder image 200.

The auxiliary information arrangement unit 128 reads auxiliary information corresponding to the icon image 202 arranged in the area of focus from the attribute information storage unit 140 and arranges the read auxiliary information in auxiliary information display area 210 to the right of the icon image 202. In this case, the auxiliary information arrangement unit 128 reads the file name and the date and time that the file was created (date and time that the image was taken) from the attribute information storage unit 140 and arranges the file name and the date and time in the auxiliary information display area 210. In the menu screen of FIG. 6, the auxiliary information display area 210 is provided only to the right of the icon image 202 located in the area of focus. Alternatively, the auxiliary information display area 210 may also be provided to the right of the icon images 204 and 206.

Further, the mark arrangement unit 126 reads information identifying the display format from the attribute information storage unit 140 and arranges a mark 212 corresponding to the display format, associating the mark with the icon image 202. The mark 212 is an example of format information indicating the display format. In the menu screen shown in FIG. 6, the mark arrangement unit 126 arranges the mark 212 to the right of the icon image 202 and below the auxiliary information display area 210. Alternatively, the mark 212 may be arranged to overlap the icon image 202 or arranged in the neighborhood. The mark 212 represents information for presenting the display format of image data to the user. The mark arrangement unit 126 may determine the position of the mark 212 so that the user can recognize that the mark 212 represents the display format of the MP file corresponding to the icon image 202.

If the display format identified by the display format identification unit 124 is "stereoscopic view", the mark arrangement unit 126 arranges the mark 212 "3D" shown in FIG. 6 in association with the icon image 202. If the display format identified by the display format identification unit 124 is "multiangle", the mark arrangement unit 126 arranges the mark 212 "MA" in association with the icon image 202.

Attaching the mark 212 to the icon image 202 in the menu screen lets the user expect that the MP file identified by the icon image 202 is displayed in a stereoscopic view. If the mark "MA" is attached to the icon image 202 in the menu screen, the user expects that the MP file identified by the icon image 202 is displayed in a multiangle format. If the mark arrangement unit 126 learns that the display device 12 is not 3D compatible by referring to the display output format stored in the display information storage unit 138, the mark arrangement unit 126 may not display the mark 212 "3D".

As described, the selection image generation unit 120 generates a menu image based on the attribute information stored in the attribute information storage unit 140. Alternatively, the selection image generation unit 120 may generate a menu screen by identifying the display format of an MP file based on the attribute information of the MP file stored in the image data storage unit 142.

Reproduction Processing of Image Data

When the user presses a predetermined button of the input device 20 while the menu screen shown in FIG. 6 is being displayed, the image viewer is started and reproduction of the MP file identified by the icon image 202 located in the area of focus is started.

The display format identification unit 162 in the reproduction processing unit 160 identifies the display format defined in the MP file. Like the display format identification unit 124, the display format identification unit 162 identifies the display format by referring to the attribute information stored in the attribute information storage unit 140. Alternatively, the display format identification unit 162 may refer to the auxiliary information of the MP file to identify the display format. In this case, the display format identification unit 162 can identify the display format defined in the MP file by using the method described with reference to the display format identification unit 124.

The image generation unit 164 generates a display image by using at least one of a plurality of items of image data associated with each other. According to the embodiment, the image generation unit 164 uses at least one of a plurality of items of image data included in an MP file to generate a display image. It is ideal that the image viewer generate an image in the display format defined in the MP file.

However, if the information processing device 10 is configured not to permit the display format "stereoscopic view" and/or "multiangle", for example, the image viewer does not reproduce an MP file in the display format "stereoscopic view" and/or "multiangle". The image viewer may not generate an image in the display format defined in the MP file due to another application or peripheral device. Typically, the image viewer does not reproduce an MP file in the 3D format if the display device 12 is not compatible with 3D. Further, if the version of the image viewer installed in the information processing device 10 is old, the image viewer may not be compatible with the display format "stereoscopic view" or "multiangle".

For this reason, the image generation unit 164 determines whether to generate an image in the display format identified by the display format identification unit 162. If it is determined not to generate an image in the identified display format, the image generation unit 164 generates an image in a display format different from the identified display format. More specifically, if it is determined by the display format identification unit 162 that the display format is "stereoscopic view" or "multiangle", the image generation unit 164 uses one of the items of image data included in the MP file and generates a display image in a display format different from the identified display format. The display format identified by the display format identification unit 162 is the same as the display format indicated by the mark 212 in the menu screen. Therefore, the image generation unit 164 generates a display image in a display format different from the display format indicated by the mark 212. For example, where the display format is "stereoscopic view", the image generation unit 164 generates a two-dimensional display image using the image for the left eye. Alternatively, where the display format is "multiangle", the image generation unit 164 generates a display image using the image data for the representative image.

Since the user seeing the mark shown in the menu screen expects that the image is displayed in a stereoscopic view or in a multiangle format. Therefore, the display image generated by the image generation unit 164 does not meet the expectation of the user, causing the user to experience discomfort. Therefore, in case the image generation unit 164 generates a display image in a display format different from the display format indicated by the mark displayed on the menu screen, the message communication unit 166 reads a message corresponding to the display format indicated by the mark from the hard disk drive 50 and shows the message to the user. Messages dependent on respective display formats are stored in the hard disk drive 50.

Figure 7:
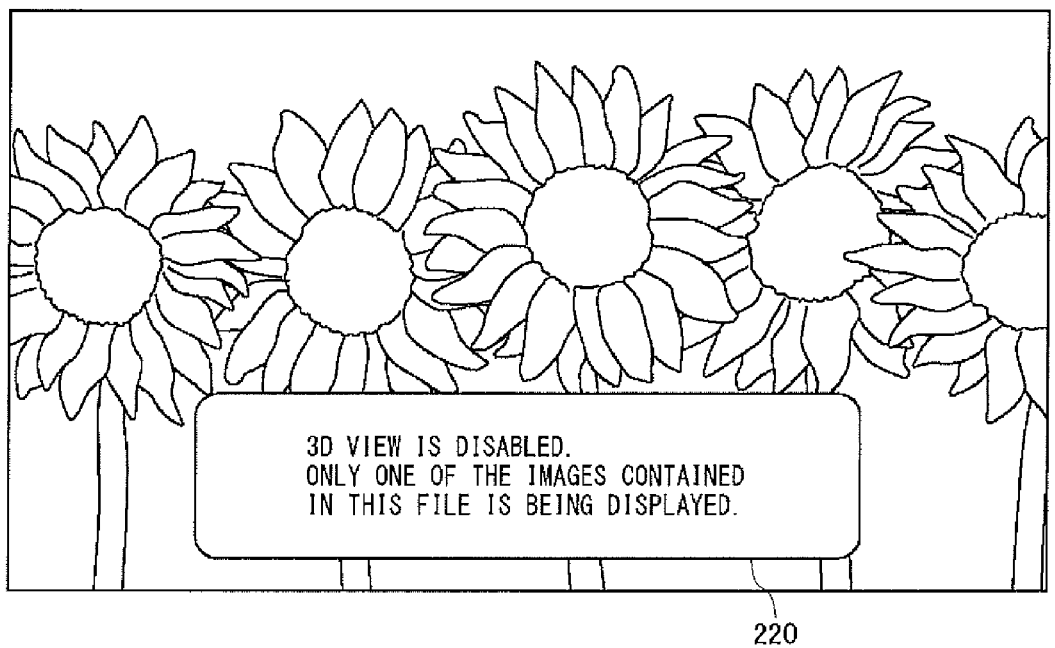
FIG. 7 shows an exemplary message communication screen.

FIG. 7 shows a message shown when the display format defined in an MP file is "stereoscopic view". The message communication unit 166 shows a message 220 corresponding to the display format identified by the display format identification unit 162. The message 220 is a note that lets the user know that stereoscopic view is disabled.

The message communication unit 166 may refer to the output format of the display stored in the display information storage unit 138 and determine whether to show the message 220. If the output format of the display is "2D compatible", i.e., if the display is only capable of two-dimensional display, it is impossible for the display device 12 to display an image in the 3D format and the user does not expect three-dimensional display. Therefore, if the display format of the display is "2D compatible", the message communication unit 166 does not show the message 220.

Figure 8:
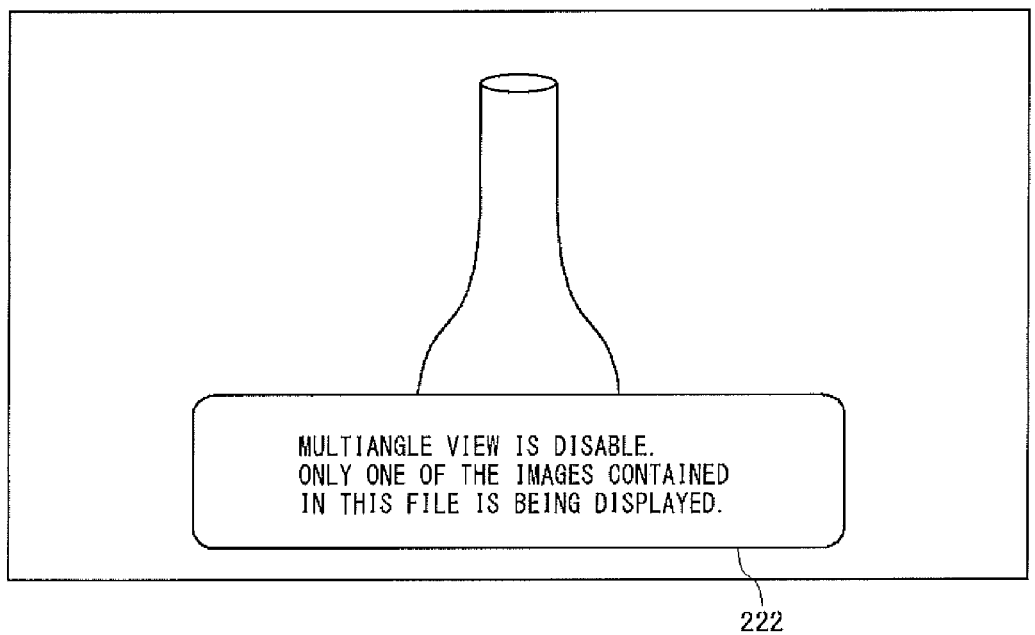
FIG. 8 shows another exemplary message communication screen.

FIG. 8 shows a message shown when the display format defined in an MP file is "multiangle". The message communication unit 166 shows a message 222 corresponding to the display format identified by the display format identification unit 162. The message 222 is a note that lets the user know that multiangle view is disabled.

Multiangle display is a two-dimensional display format and so the display device 12 is ideally capable of display an image in the "multiangle" format whether the display is "2D compatible" or "3D compatible". The user also expects multiangle display. Therefore, the message communication unit 166 shows the message 222 irrespective of the display format of the display.

When the message communication unit 166 shows a message, the unit 166 causes the communication storage unit 180 to store the fact. This causes the communication storage unit 180 to record the fact that the message communication unit 166 showed the message. For example, the communication storage unit 180 may be configured as a communication flag. A communication flag set to 1 indicates that a message is shown. A communication flag set to 0 indicates that a message is not shown. Regardless of whether the message 220 is shown or the message 222 is shown, the message communication unit 166 sets the communication flag to 1. The value of the communication flag is maintained while the information processing device 10 is being powered. Therefore, once the communication flag is set to 1, the communication storage unit 180 maintains the content of storage until the information processing device 10 is turned off.

The content of storage in the communication storage unit 180 is deleted once the information processing device 10 is no longer powered. In other words, the communication flag is returned to 0 when the information processing device 10 is turned off. The communication flag may be reset to 0 when the information processing device 10 is turned on. Therefore, when the information processing device 10 is restarted, the communication flag is set to 0. When the message communication unit 166 shows a message, the communication flag is set to 1. As mentioned above, once the communication flag is set to 1, the state is maintained until the information processing device 10 is no longer powered.

If the communication flag is set to 1, the message communication unit 166 does not show a message again even if the image generation unit 164 generates a display image in a display format different from the display format indicated by the mark included in the menu screen. Therefore, the message communication unit 166 does not show a message twice while the information processing device 10 is being powered. Also, the message 222 is not shown once the message 220 is shown. For the same reason, the message 222 is not shown twice, and the message 220 is not shown once the message 222 is shown.

The user recognizes that the image viewer is not capable of stereoscopic display or multiangle display by seeing one of the message 220 or the message 222. The user does not find it desirable if the message communication unit 166 shows messages repeatedly. Accordingly, the message communication unit 166 is configured to show a message only once while the information processing device 10 is being turned on.

The image viewer according to the embodiment is provided with the function of successively reproducing a plurality of MP files stored in the same folder. In the above example, once the communication flag is set to 1, the communication storage unit 180 maintains the flag value until the information processing device 10 is turned off. Alternatively, the communication storage unit 180 may reset the flag value and return it to 0 when the image viewer is closed. The content stored in the communication storage unit 180 is deleted when the image viewer is closed. The message 220 or the message 222 is displayed only once while the image viewer is being run also in this case so that the message communication unit 166 is prevented from showing messages repeatedly.

Figure 9:
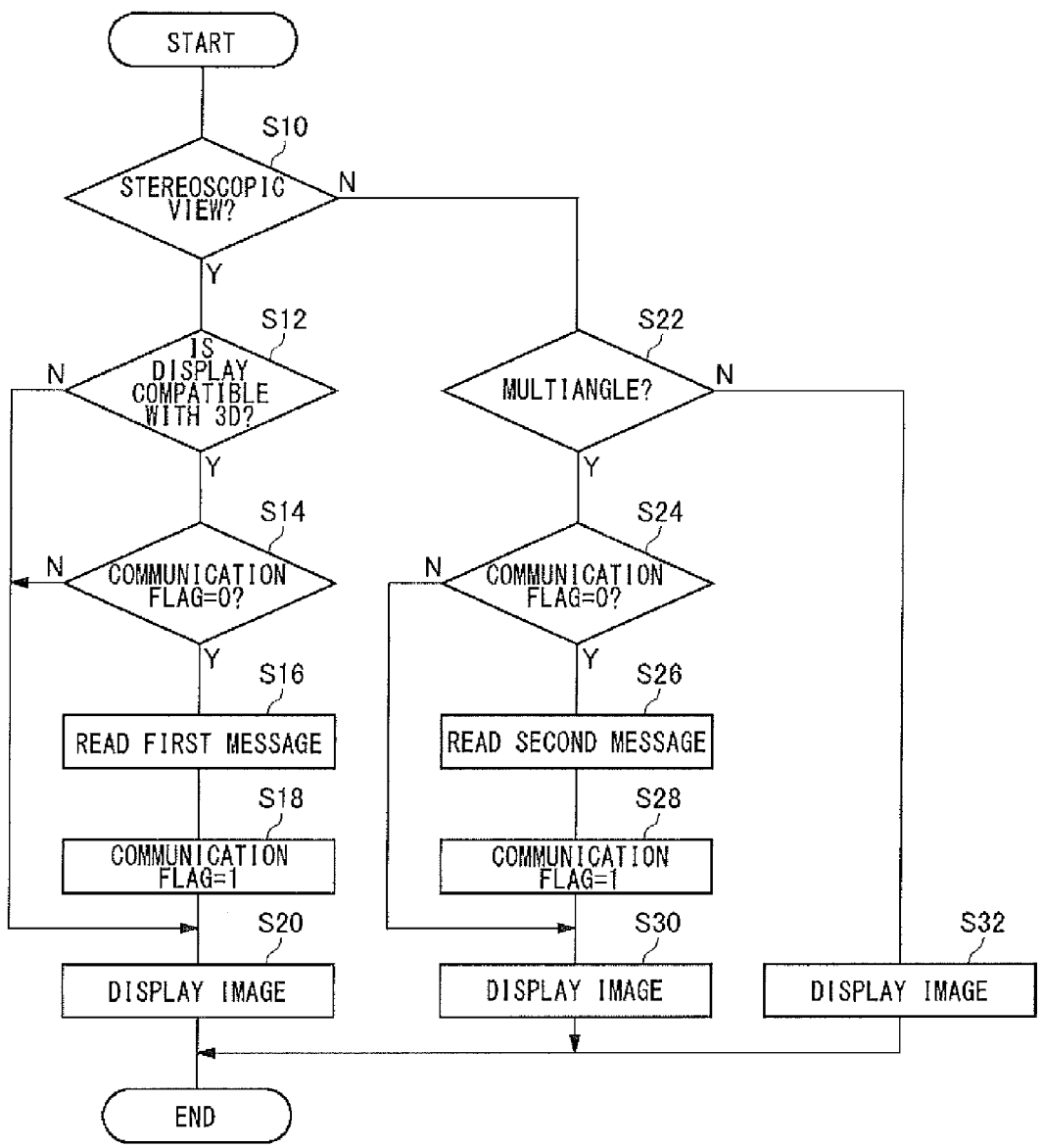
FIG. 9 is a flowchart showing a process of image reproduction.

FIG. 9 is a flowchart showing a process of reproduction. The flow is executed each time when an image file is designated for display.

The display format identification unit 162 determines whether the display format defined in the MP file is "stereoscopic view" (S10). If the defined display format is "stereoscopic view" (Y in S10), the message communication unit 166 refers to the display format of the display (S12). If the display format of the display is "2D compatible" (N in S12), the image generation unit 164 generates two-dimensional image data using the image data for the left eye and the display processing unit 44 outputs the display image data to the display device 12 (S20).

If the display format of the display is "3D compatible" (Y in S12), the message communication unit 166 refers to the communication flag stored in the communication storage unit 180 (S14). If the communication flag is set to 1 (N in S14), the image generation unit 164 generates two-dimensional image data using the image data for the left eye and the display processing unit 44 outputs the display image data to the display device 12 (S20). If the communication flag is set to 0 (Y in S14), the message communication unit 166 reads the message 220 from the hard disk drive 50 (S16) and sets the communication flag to 1 (S18). The image generation unit 164 generates two-dimensional display image data using the image data for the left eye and the display processing unit 44 outputs image data in which the message 220 overlaps the display image (S20).

If the defined display format is "multiangle" (Y in S22) instead of "stereoscopic view" (N in S10), the message communication unit 166 refers to the communication flag stored in the communication storage unit 180 (S24). If the communication flag is set to 1 (N in S24), the image generation unit 164 generates two-dimensional image data using the image data for the representative image and the display processing unit 44 outputs the display image data to the display device 12 (S30). If the communication flag is set to 0 (Y in S24), the message communication unit 166 reads the message 222 from the hard disk drive 50 (S26) and sets the communication flag to 1 (S28). The image generation unit 164 generates two-dimensional display image data using the image data for the representative image and the display processing unit 44 outputs image data in which the message 222 overlaps the display image (S30).

If the defined display format is not "multiangle" (N in S22), the image generation unit 164 generates display image data according to the defined display format and the display processing unit 44 outputs the display image data to the display device 12 (S32).

Described above is an explanation based on an exemplary embodiment. The embodiment is intended to be illustrative only and it will be obvious to those skilled in the art that various modifications to constituting elements and processes could be developed and that such modifications are also within the scope of the present invention.

What is claimed is:

1. An information processing device comprising:
a first image generation unit configured to generate a first image including a selection screen image for presenting on a display screen:
  (i) a plurality of selectable images, each representing a respective at least one image file containing data for displaying an image on the display screen, and at least one of the selectable images representing at least one image file containing a plurality of items of image data associated with one another for displaying a multi-picture format image, the multi-picture format image being at least one single image that is generated by combining at least two separate image data files among the plurality of items of image data that are associated with one another, and
  (ii) format information indicating a display format of the multi-picture format image, where the format information identifies the display format, which identifies any of a plurality of digital processes by which the at least two separate image data files among the plurality of items of image data that are associated with one another are combined to generate the single image of the multi-picture format image and then display the single image of the multi-picture format image;
a determination unit configured to determine whether it is possible to display on the display screen the multi-picture format image in the display format indicated by the format information;
a second image generation unit configured to, when the determination is affirmative, generate a second image in a determined display format by using at least one of the plurality of items of image data associated with each other of the multi-picture format image, and in the determined format in accordance with the determination by the determination unit; and
a message communication unit configured to, when the determination is negative, communicate a predetermined message on the second image indicating that the display format of the multi-picture format image indicated by the format information included in the first image was not used when the second image generation unit generates the second image in the determined display format that is different from the display format indicated by the format information.

2. The information processing device according to claim 1, wherein the first image generation unit comprises:
   an icon image processing unit configured to arrange, in the first image, a respective icon image corresponding to each of the plurality of selectable images; and
   a mark arrangement unit configured to arrange, in the first image, a mark indicating the display format of the multi-picture format image in association with the icon image corresponding to the selectable image representing the multi-picture format image.

3. The information processing device according to claim 1, wherein the message communication unit communicates a message corresponding to the display format indicated by the format information.

4. The information processing device according to claim 1, further comprising:
   a communication storage unit configured to store a record indicating that the message communication unit communicated a message,
   wherein, if the communication storage unit stores the record indicating that the message was communicated, the message communication unit does not communicate a message again when the second image generation unit generates the second image in the determined display format that is different from the display format indicated by the format information included in the first image.

5. The information processing device according to claim 4, wherein, once the communication storage unit stores the record indicating that the message was communicated, the communication storage unit maintains the record until the information processing device is turned off.

6. The information processing device according to claim 4, wherein
   a function of the second image generation unit is implemented by a predetermined application, and
   the communication storage unit stores the record indicating that the message was communicated while the application is being executed, and, when the application is terminated, the content of storage is deleted.

7. The information processing device according to claim 1, wherein the message communication unit refers to the output format of the display and determines whether to communicate the message accordingly.

8. An information processing method comprising:
   generating and displaying a first image including a selection screen image on a display screen, the selection screen image including:
   (i) a plurality of selectable images, each representing a respective at least one image file containing data for displaying an image on the display screen, and at least one of the selectable images representing at least one image file containing a plurality of items of image data associated with one another for displaying a multi-picture format image, the multi-picture format image being at least one single image that is generated by combining at least two separate image data files among the plurality of items of image data that are associated with one another, and
   (ii) format information indicating a display format of the multi-picture format image, where the format information identifies the display format, which identifies any of a plurality of digital processes by which the at least two separate image data files among the plurality of items of image data that are associated with one another are combined to generate the single image of the multi-picture format image and then display the single image of the multi-picture format image;
   determining whether it is possible to display on the display screen the multi-picture format image in the display format indicated by the format information;
   when the determination is affirmative, generating and displaying a second image in a determined display format on the display screen by using at least one of the plurality of items of image data associated with each other of the multi-picture format image, and in the determined format in accordance with the determination by the determination unit; and
   when the determination is negative, communicating a predetermined message on the second image indicating that the display format of the multi-picture format image indicated by the format information included in the first image was not used when the second image generation unit generates the second image in the determined display format that is different from the display format indicated by the format information.

9. An information processing method comprising:
   generating a first image including a selection screen image for presenting on a display screen the selection screen image including:
   (i) a plurality of selectable images, each representing a respective at least one image file containing data for displaying an image on the display screen, and at least one of the selectable images representing at least one image file containing a plurality of items of image data associated with one another for displaying a multi-picture format image, the multi-picture format image being at least one single image that is generated by combining at least two separate image data files among the plurality of items of image data that are associated with one another, and
   (ii) format information indicating a display format of the multi-picture format image, where the format information identifies the display format, which identifies any of a plurality of digital processes by which the at least two separate image data files among the plurality of items of image data that are associated with one another are combined to generate the single image of the multi-picture format image and then display the single image of the multi-picture format image;
   determining whether it is possible to display on the display screen the multi-picture format image in the display format indicated by the format information;
   when the determination is affirmative, generating and displaying a second image in a determined display format on the display screen by using at least one of the plurality of items of image data associated with each other of the multi-picture format image, and in the determined format in accordance with the determination by the determination unit; and
   when the determination is negative, communicating a predetermined message on the second image indicating that the display format of the multi-picture format image indicated by the format information included in the first image was not used when the second image generation unit generates the second image in the determined display format that is different from the display format indicated by the format information.

10. A non-transitory computer readable recording medium containing a computer program, the computer program comprising:

a module configured to generate and display a first image including a selection screen image on a display screen, the selection screen image including:
(i) a plurality of selectable images, each representing a respective at least one image file containing data for displaying an image on the display screen, and at least one of the selectable images representing at least one image file containing a plurality of items of image data associated with one another for displaying a multi-picture format image, the multi-picture format image being at least one single image that is generated by combining at least two separate image data files among the plurality of items of image data that are associated with one another, and
(ii) format information indicating a display format of the multi-picture format image, where the format information identifies the display format, which identifies any of a plurality of digital processes by which the at least two separate image data files among the plurality of items of image data that are associated with one another are combined to generate the single image of the multi-picture format image and then display the single image of the multi-picture format image;
a module configured to determine whether it is possible to display on the display screen the multi-picture format image in the display format indicated by the format information;
a module configured to, when the determination is affirmative, generate and display a second image in a determined display format on the display screen by using at least one of the plurality of items of image data associated with each other of the multi-picture format image, and in the determined format in accordance with the determination by the determination unit; and
a module configured to, when the determination is negative, communicate a predetermined message on the second image indicating that the display format of the multi-picture format image indicated by the format information included in the first image was not used when the module to generate an image generates the image in the determined display format that is different from a display format identified by format information.

11. A processor executing a computer program embedded in a non-transitory computer-readable recording medium such that the processor carries out actions, comprising:

generating and displaying a first image including a selection screen image on a display screen, the selection screen image including:
(i) a plurality of selectable images, each representing a respective at least one image file containing data for displaying an image on the display screen, and at least one of the selectable images representing at least one image file containing a plurality of items of image data associated with one another for displaying a multi-picture format image, the multi-picture format image being at least one single image that is generated by combining at least two separate image data files among the plurality of items of image data that are associated with one another, and
(ii) format information indicating a display format of the multi-picture format image, where the format information identifies the display format, which identifies any of a plurality of digital processes by which the at least two separate image data files among the plurality of items of image data that are associated with one another are combined to generate the single image of the multi-picture format image and then display the single image of the multi-picture format image;
determining whether it is possible to display on the display screen the multi-picture format image in the display format indicated by the format information;
when the determination is affirmative, generating and displaying a second image in a determined display format on the display screen by using at least one of the plurality of items of image data associated with each other of the multi-picture format image, and in the determined format in accordance with the determination by the determination unit; and
when the determination is negative, communicating a predetermined message on the second image indicating that the display format of the multi-picture format image indicated by the format information included in the first image was not used when the second image generation unit generates the second image in the determined display format that is different from the display format indicated by the format information.

* * * * *